(12) United States Patent
Demmer (10) Patent No.: US 11,778,579 B2
(45) Date of Patent: Oct. 3, 2023

(54) FREQUENCY DRIFT COMPENSATION IN A DISTRIBUTED MULTIPLE-INPUT-MULTIPLE-OUTPUT NETWORK

(71) Applicant: Commissariat à l'Energie Atomique et aux Energies Alternatives, Paris (FR)

(72) Inventor: David Demmer, Grenoble (FR)

(73) Assignee: Commissariat à l'Energie Atomique et aux Energies Alternatives, Paris (FR)

( * ) Notice: Subject to any disclaimer, the term of this patent is extended or adjusted under 35 U.S.C. 154(b) by 4 days.

(21) Appl. No.: 17/663,532

(22) Filed: May 16, 2022

(65) Prior Publication Data
US 2022/0377688 A1    Nov. 24, 2022

(30) Foreign Application Priority Data

May 20, 2021    (FR) ...................................... 2105275

(51) Int. Cl.
*H04W 56/00*    (2009.01)

(52) U.S. Cl.
CPC .............................. *H04W 56/004* (2013.01)

(58) Field of Classification Search
CPC ............... H04W 56/004; H04B 7/0456; H04L 25/03343; H04L 5/0023; H04L 5/0091
See application file for complete search history.

(56) References Cited

U.S. PATENT DOCUMENTS

| | | | | |
|---|---|---|---|---|
| 4,312,053 A | * | 1/1982 | Lipsky | ...................... G01S 5/20 367/127 |
| 8,320,301 B2 | * | 11/2012 | Walton | ................... H04W 72/12 375/276 |
| 2004/0085209 A1 | * | 5/2004 | Schmidt | ............. G08B 13/1427 340/539.13 |
| 2007/0004465 A1 | * | 1/2007 | Papasakellariou | .. H04W 52/325 455/571 |
| 2010/0220011 A1 | * | 9/2010 | Heuser | ................... G01S 5/0273 342/386 |
| 2010/0316163 A1 | * | 12/2010 | Forenza | ................. H04L 27/364 375/296 |
| 2011/0002371 A1 | * | 1/2011 | Forenza | ................ H04B 17/309 375/227 |
| 2011/0002411 A1 | * | 1/2011 | Forenza | ............ H04L 25/03343 375/267 |
| 2011/0003606 A1 | * | 1/2011 | Forenza | ............ H04L 25/03343 455/501 |

(Continued)

OTHER PUBLICATIONS

Shubhi, Ilmiawan, and Hidekazu Murata. "Dynamic precoder for massive MIMO in the presence of large Doppler spread." 2017 IEEE 85th Vehicular Technology Conference (VTC Spring). IEEE, 2017.

(Continued)

*Primary Examiner* — Stephen J Clawson
(74) *Attorney, Agent, or Firm* — Moreno IP Law LLC (57) ABSTRACT

The present disclosure concerns a method of estimation and correction, at the level of a base station, of a frequency drift ($\Delta F1$, $\Delta Fi$, $\Delta FN$) between signals transmitted by a plurality of antenna systems (306_1, 306_i, 306_N) spatially distributed around a computing unit of the base station (304) and signals received by a radio device (310).

14 Claims, 7 Drawing Sheets

(56) References Cited

U.S. PATENT DOCUMENTS

| | | | | |
|---|---|---|---|---|
| 2011/0003607 | A1* | 1/2011 | Forenza | H04B 7/0413 455/501 |
| 2011/0003608 | A1* | 1/2011 | Forenza | H04B 7/01 455/500 |
| 2012/0122495 | A1* | 5/2012 | Weng | H04W 68/025 455/458 |
| 2015/0030092 | A1* | 1/2015 | Krishnamurthy | H04B 7/0421 375/267 |
| 2016/0381576 | A1* | 12/2016 | Hadani | H04L 27/366 370/330 |
| 2017/0041058 | A1* | 2/2017 | Forenza | H04B 7/0452 |
| 2017/0054482 | A1* | 2/2017 | Forenza | H04B 7/0626 |
| 2017/0223653 | A1* | 8/2017 | Weitnauer | H04W 56/0045 |
| 2022/0094403 | A1* | 3/2022 | Forenza | H04B 7/0456 |
| 2022/0158700 | A1* | 5/2022 | Forenza | H04B 7/0456 |
| 2022/0311489 | A1* | 9/2022 | Rakib | H04L 25/0226 |

OTHER PUBLICATIONS

Preliminary Search Report for French Application No. 2105275 dated Feb. 3, 2022, 2 pages.

Zarikoff, Brad W., and James K. Cavers. "Coordinated multi-cell systems: Carrier frequency offset estimation and correction." IEEE Journal on Selected Areas in Communications 28.9 (2010): 1490-1501.

Zeng, Rong, et al. "Joint estimation of frequency offset and Doppler shift in high mobility environments based on orthogonal angle domain subspace projection." IEEE Transactions on Vehicular Technology 67.3 (2017): 2254-2266.

* cited by examiner

FREQUENCY DRIFT COMPENSATION IN A DISTRIBUTED MULTIPLE-INPUT-MULTIPLE-OUTPUT NETWORK

FIELD

The present disclosure generally concerns the field of wireless networks and more particularly of distributed multiple-input-multiple-output systems.

BACKGROUND

Networks of antennas spatially distributed within one or a plurality of base stations are more and more used in the field of wireless communications. These distributed multiple-input-multiple-output networks improve the coverage of the network and are used for very high frequency communications. However, the performance of a multiple-input-multiple-output network degrades when the radio device of the signal is mobile. Indeed, the mobility of the radio device causes an offset in the frequencies of the received signals by Doppler effect.

Further, other frequency offsets may result from a poor synchronization between the clock of the radio device and the clocks of the antenna systems of the distributed network. This phenomenon is called carrier frequency offset.

These different offsets of the frequencies adversely affect the restoring of the signal by recombination of the multiple received signals.

SUMMARY

There is a need to improve techniques of compensation of frequency offsets induced by the displacements of a radio device as well as by the poor synchronization of the clocks. The described embodiments provide a technique of joint estimation of different frequency offset sources in the case of a distributed or cooperative multiple-input-multiple-output system.

An embodiment overcomes all or part of the disadvantages of known distributed multiple-input-multiple-output networks.

An embodiment provides a method of estimation and correction, at the level of a base station, of a frequency drift between signals transmitted by a plurality of antenna systems spatially distributed around a computing unit of the base station and signals received by a radio device, the method comprising:

a) the sending, by the radio device, of a first signal, said signal being received by each of the antenna systems;

b) the conversion, by the antenna systems, of said first received signal into second baseband signals, and their transmission, by the antenna systems to the computing unit;

c) the measurement, by the computing unit, of angles of arrival of the second signals and of the frequency drift of the second baseband signals;

d) the estimation, by the computing unit, of a displacement angle of the radio device, of a first frequency offset induced by the displacement of the radio device and of a second frequency offset between a clock of the radio device and synchronized clocks of the antenna systems;

e) the frequency adjustment and the pre-coding, by the computing unit and for each of the antenna systems, of third baseband signals; and f) the transmission, by the computing unit, of the third baseband signals to the plurality of antenna systems and the transmission, by said plurality of antenna systems, of said third baseband signals to the radio device.

According to an embodiment, the estimation of the displacement angle of the radio device, of the first frequency offset, and of the second frequency offset, is performed by resolution of a regression problem described by the following expression:

$$\Delta F_i = F_{CFO} + F_{DOP} \cos(\theta_i - \theta_M), i \in \{1, \ldots, N\}, \quad \text{(Math 1)}$$

where N designates the number of antenna systems, i designates the rank of the antenna system, $\Delta F_i$ designates the frequency drift measured by the antenna system of rank i, $\theta_i$ designates the angle of arrival measured by the antenna system of rank i, $\theta_M$ designates the displacement angle of the radio device, $F_{COF}$ and $F_{DOP}$ respectively designate the first and the second frequency offset.

According to an embodiment, the regression problem is solved by means of a linearization of the expression describing said regression problem, the linearization being written as:

$$\Delta F_i = F_{CFO} + F_{DOP} \cos(\theta_M)\cos(\theta_i) + F_{DOP} \sin(\theta_M)\sin(\theta_i), i \in \{1, \ldots, N\}. \quad \text{(Math 2)}$$

According to an embodiment, the displacement angle of the radio device is estimated independently from the location of the radio device.

According to an embodiment, the frequency adjustment of the third signals transmitted to the radio device is performed by adapting the directivity and/or the power and/or the phase of each antenna system based on said estimate.

According to an embodiment, the adaptation of the antenna systems is controlled by the computing unit.

According to an embodiment, for each of the antenna systems, the frequency adjustment of the third transmitted signals comprises a compensation of the channel aging effect based on the estimate.

According to an embodiment, steps a) to f) are periodically repeated.

An embodiment provides a system comprising a plurality of antenna systems and a base station such as described, said antenna systems being spatially distributed around a computing unit of the base station.

According to an embodiment, the antenna systems contain radio frequency heads.

According to an embodiment, the computing unit of the base station is configured to implement the estimation of said displacement angle, of said first frequency offset, and of said second frequency offset.

According to an embodiment, the system comprises a plurality of base stations communicating with one another, one of these base stations performing said estimation and transmitting adaptation parameters to the other base stations.

According to an embodiment, the other base stations are radio frequency heads.

According to an embodiment, the propagation channels of the third signals transmitted by the antenna systems are single-path.

BRIEF DESCRIPTION OF THE DRAWINGS

The foregoing features and advantages, as well as others, will be described in detail in the following description of specific embodiments given by way of illustration and not limitation with reference to the accompanying drawings, in which.

DETAILED DESCRIPTION OF THE PRESENT EMBODIMENTS

Like features have been designated by like references in the various figures. In particular, the structural and/or functional features that are common among the various embodiments may have the same references and may dispose identical structural, dimensional and material properties.

For the sake of clarity, only the steps and elements that are useful for an understanding of the embodiments described herein have been illustrated and described in detail. In particular, the internal operation of the antenna systems and the type of modulation of the signals are not detailed.

Unless indicated otherwise, when reference is made to two elements connected together, this signifies a direct connection without any intermediate elements other than conductors, and when reference is made to two elements coupled together, this signifies that these two elements can be connected or they can be coupled via one or more other elements.

In the following disclosure, unless otherwise specified, when reference is made to absolute positional qualifiers, such as the terms "front", "back", "top", "bottom", "left", "right", etc., or to relative positional qualifiers, such as the terms "above", "below", "upper", "lower", etc., or to qualifiers of orientation, such as "horizontal", "vertical", etc., reference is made to the orientation shown in the figures.

Unless specified otherwise, the expressions "around", "approximately", "substantially" and "in the order of" signify within 10%, and preferably within 5%.

Figure 1:
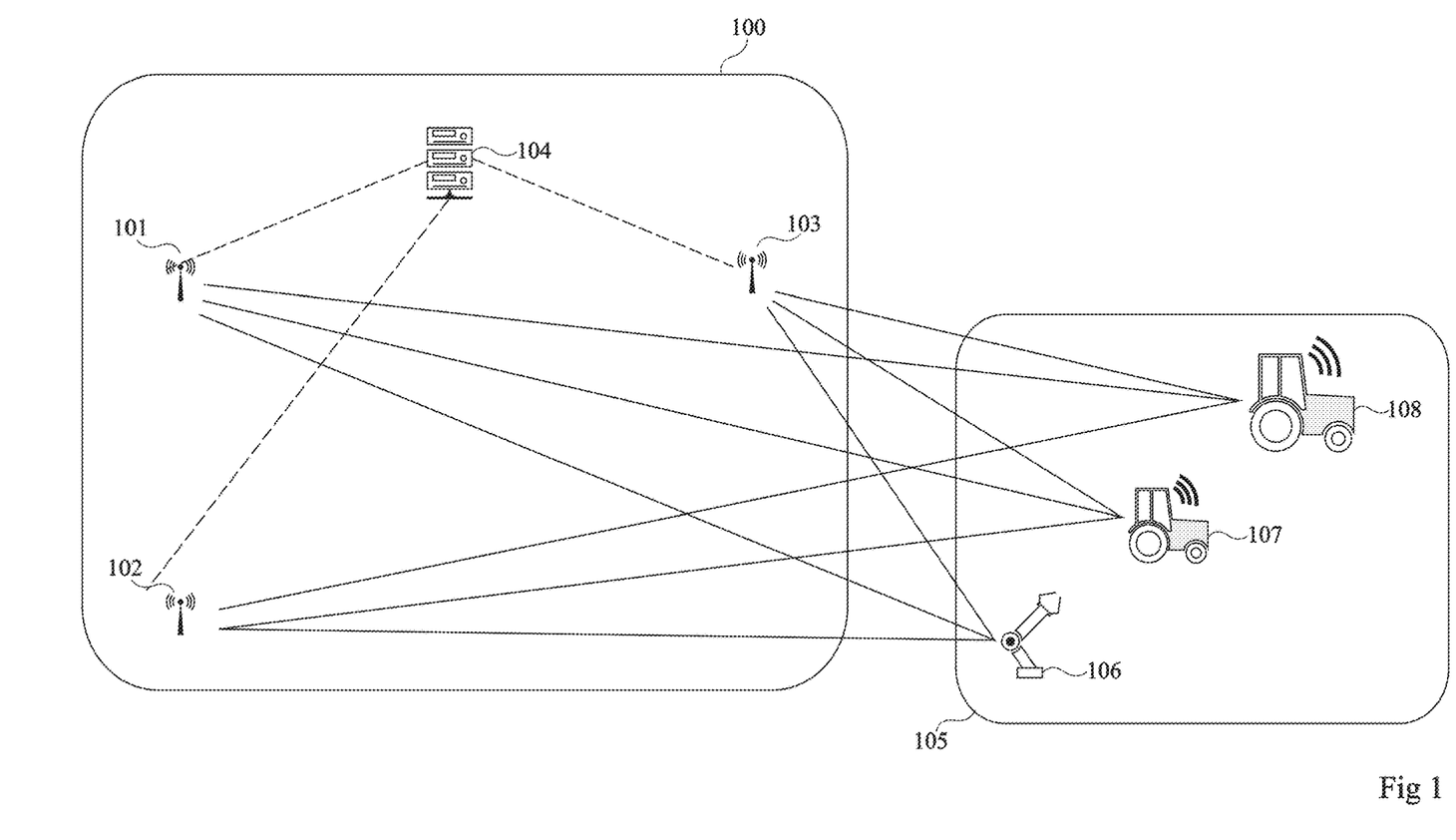
FIG. 1 shows an example of a distributed multiple-input-multiple-output system of the type to which the described embodiments apply.

FIG. 1 shows an example of a distributed multiple-input-multiple-output system of the type to which the described embodiments apply.

The system shown in FIG. 1 corresponds to a distributed multiple-input-multiple-output network implemented by a base station 100. Base station 100 comprises, in this arbitrary example, three antenna systems 101, 102, and 103 spatially distributed around a computing unit 104. Antenna systems 101, 102, and 103 form a distributed multiple-input-multiple-output network. Antenna systems 101, 102, and 103 are each provided with a plurality of transmit/receive antennas and are capable of beam-forming techniques. They are responsible for the radio frequency processing of the signals such as the amplification, the filtering, and the transposition around the carrier frequency for the transmitted signals and in baseband for the received signals. The links (dotted lines) between antenna systems 101, 102, and 103 and the computing unit 104 of base station 100 are generally wired, for example, by means of optical fiber, and are used to exchange the baseband signals and configurations signals for antenna systems 101, 102, and 103 such as for example the adaptation of the beam forming. Base station 100 ensures a wireless connection (full line) between radio devices 106, 107, and 108 (in this example, arbitrarily, three radio devices) forming a group of radio devices 105 and antenna systems 101, 102, and 103. Radio devices 106, 107, and 108 are for example cell phones or fourth generation (4G) and/or fifth generation (5G) technology connected devices connecting on wireless communication networks. Computing unit 104 manages antenna systems 101, 102, and 103 and transmits thereto one or a plurality of signals to be transmitted (forwarded) to radio devices 106, 107, and 108.

As an example, one of the radio devices 106, 107, or 108 of the group of devices 105 simultaneously receives, via antenna systems 101, 102, and 103, a plurality of coherent signals and recombines them to restore a signal. It is spoken of a joint transmission from antenna systems 101, 102, and 103. Similarly, the antenna systems 101, 102, and 103 of base station 100 receive a same signal originating from one of the radio devices 106, 107, or 108 of the group of devices 105. It is then spoken of a joint reception.

Figure 2:
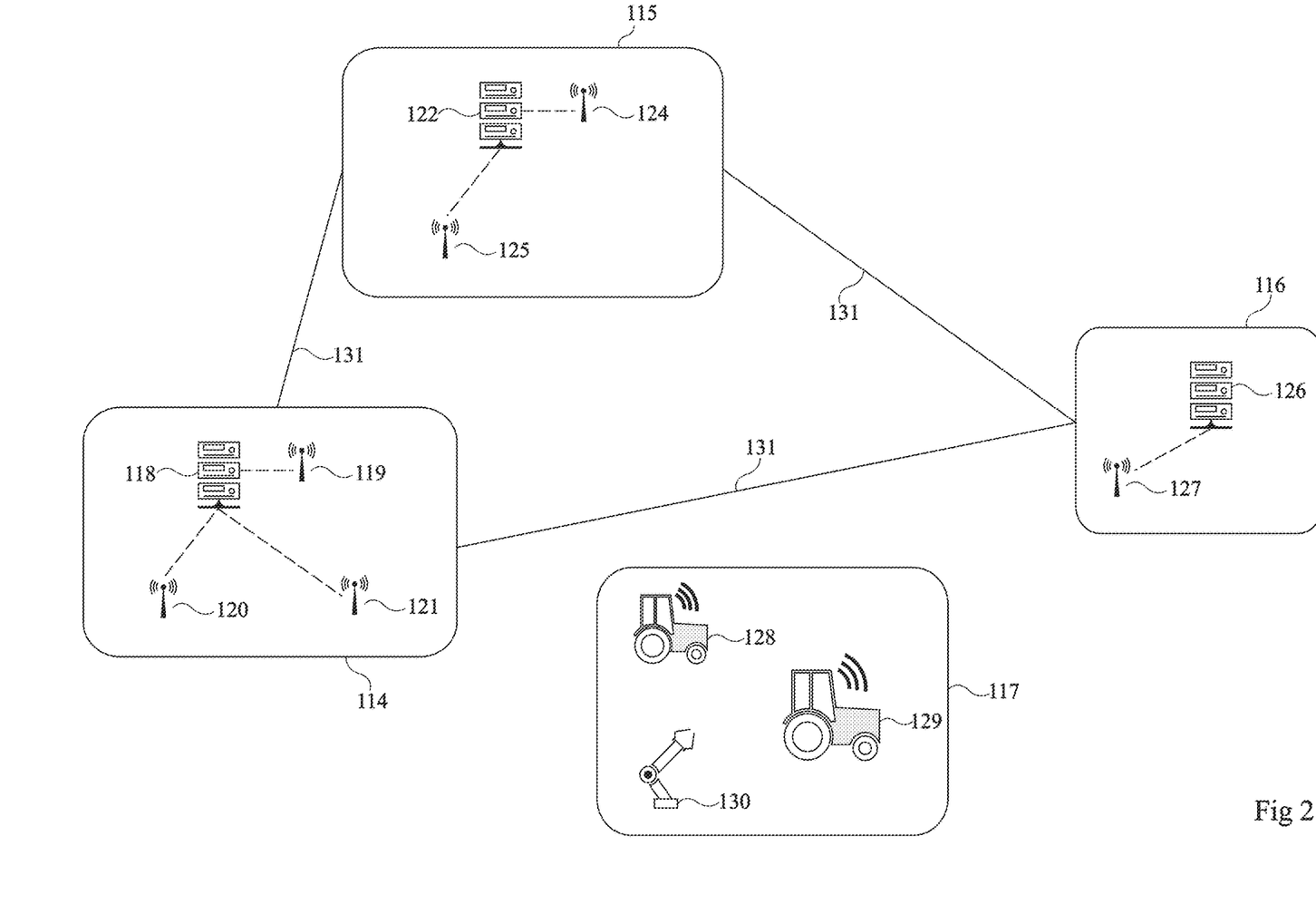
FIG. 2 shows an example of a cooperative multiple-input-multiple-output system of the type to which the described embodiments apply.

FIG. 2 shows an example of a cooperative multiple-input-multiple-output system of the type to which the described embodiments apply.

The system shown in FIG. 2 corresponds to a network comprising, in the shown example, three base stations 114, 115, and 116. Base station 114 comprises a computing unit 118 and, in this arbitrary example, three antenna systems 119, 120, and 121. Base station 115 comprises a computing unit 122 and, for example, two antenna systems 124 and 125. Base station 116 comprises a computing unit 126 and, for example, a single antenna system 127. Links 131 between base stations 114, 115, and 116 are generally wired, for example, by means of optical fiber. One of base stations 114, 115, or 116 is called central base station and manages the wireless transmissions of signals (not shown) to a group of radio devices 117 of three radio devices 128, 129, and 130. The assembly of the three base stations 114, 115, and 116 then forms a cooperative CO-MIMO (Cooperative Multiple-Input-Multiple-Output) network.

The signals transmitted by the antenna systems of the networks illustrated in FIGS. 1 and 2 are transmitted over channels or links dominated by a single path (one way) since the transmit power is concentrated on the direct path due to beam-forming techniques operated by the antenna systems of the base station.

The signals received by the antenna systems illustrated in FIGS. 1 and 2 (the uplink is not shown in FIG. 2) are dominated by a single path since the secondary paths are spatially filtered due to beam-forming techniques operated by the antenna systems of the base station.

Figure 3:
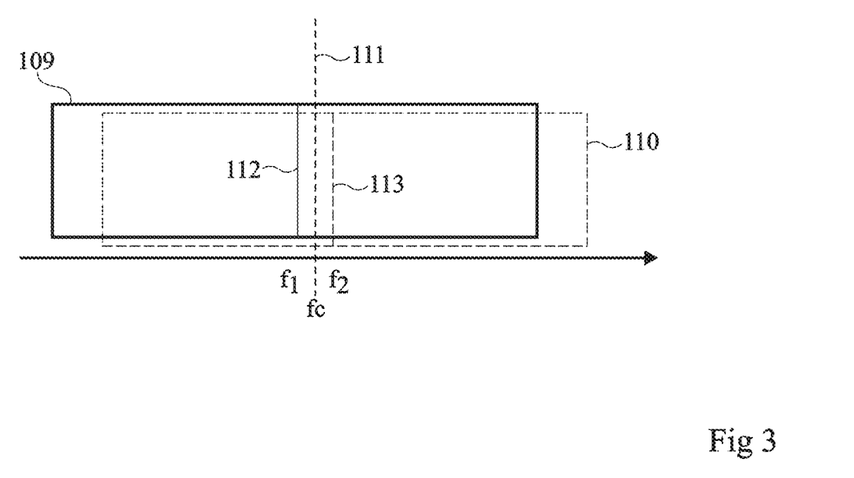
FIG. 3 is a graph illustrating the problem linked to a frequency offset in a usual system.

FIG. 3 is a graph illustrating the problem linked to a frequency offset in a usual system.

A displacement of the radio device, be it one of the devices 106, 107, or 108 of the group of the devices 105 of FIG. 1 or one of the devices 128, 129, or 130 of the group of devices 117 of FIG. 2, generates an offset between the frequencies of the transmitted signals and the frequencies of the received signals. This phenomenon is known as Doppler effect and occurs as soon as the distance between a transmitter of a signal and a radio device of the same signal varies over time.

Further, the clocks of the antenna systems are generally not synchronized with the clock of the radio device. This causes another frequency offset between the received signals and the transmitted signals.

In the example illustrated in FIG. 2, it is assumed that antenna systems 124 and 125 transmit in a frequency range (not shown) centered on a value fc (dotted lines, 111). Radio device 128 is for example mobile and its distance to antenna systems 124 and 125 varies. For example, the distance between radio device 128 and antenna system 124 decreases with the displacement of radio device 128 and the distance between radio device 128 and antenna system 125 increases with the displacement of radio device 128.

In FIG. 3, a block 109 illustrates the bandwidth where the signal transmitted by antenna system 124 is received by radio device 128. The bandwidth illustrated by block 109 is centered on a frequency $f_1$ (full line, 112) smaller than frequency $f_c$. A block 110 illustrates the bandwidth where the signal transmitted by antenna system 125 is received by radio device 128. The bandwidth illustrated by block 110 is centered on a frequency $f_2$ (dotted line, 113) greater than value $f_c$. The different signals to be recombined are thus received with frequency offsets, which adversely affects the proper restoring of the signal.

This offset due to the Doppler effect and to the poor synchronization of the clocks deteriorates the quality of the signal and, when it is too significant, may event prevent its restoring.

Figure 4:
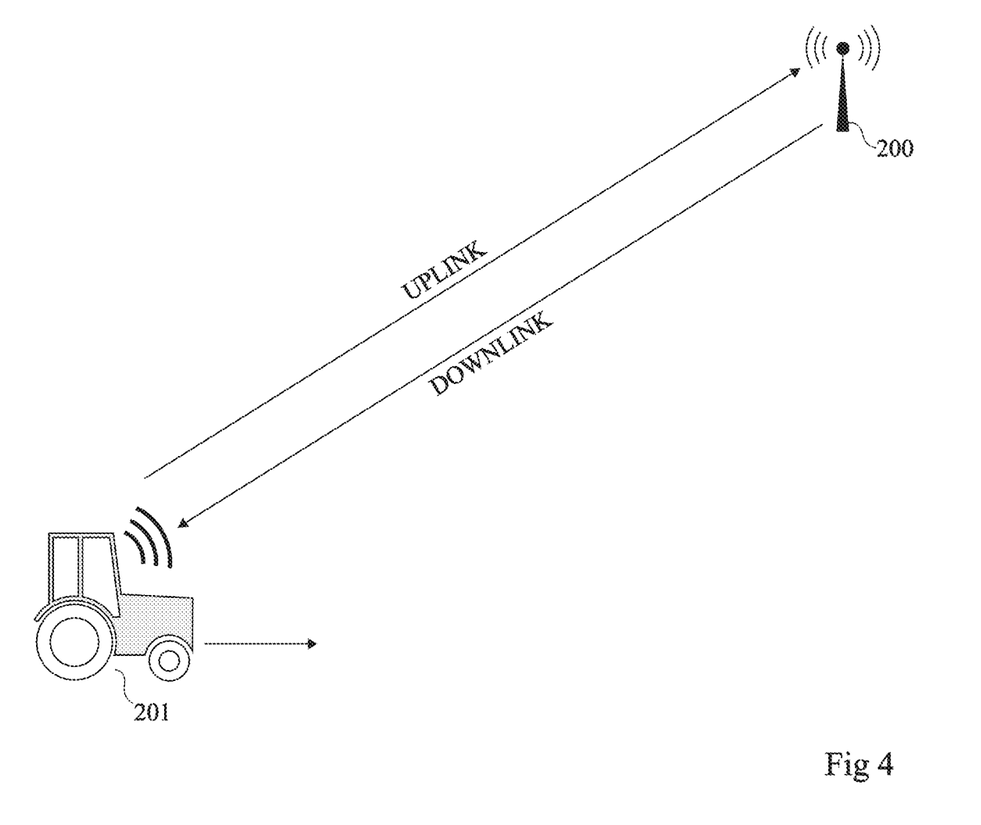
FIG. 4 very schematically illustrates an example of transmissions of signals between an antenna system of a base station and a radio device.

FIG. 4 very schematically illustrates an example of signal transmissions between an antenna system of a base station and a radio device.

In the example of FIG. 4, a radio device 201 sends, to an antenna system 200 and via an uplink or uplink channel (UPLINK), a signal having a frequency identical to the frequency of the signal previously received by radio device 201. However, the displacement of the radio device and the poor synchronization of the clocks cause an offset between the frequency of the uplink signal and the expected frequency. On the uplink, the offset between the frequency of the transmitted signal and that of the received signal can be written as:

$$\Delta F_{UL} = F_{CFO} + F_{DOP},\qquad\text{(Math 3)}$$

where $\Delta F_{UL}$ represents the difference between the frequency of the uplink signal and frequency $f_c$ (FIG. 3, 111), $F_{COF}$ (Carrier Frequency Offset) represents the value of the offset due to the poor synchronization of the clocks, and $F_{DOP}$ represents the value of the offset due to the Doppler effect, in other words, due to the displacement of radio device 201. Frequency drift $\Delta F_{UL}$ corresponds to the residual frequency offset once the received signal set back to baseband has been received by the computing unit of the base station (not illustrated in FIG. 4) containing antenna system 200.

The transmission of the uplink signal (UPLINK) enables said base station to measure an angle of arrival of the uplink signal as well as the residual frequency drift after the setting back to baseband of the received signal. The techniques for measuring the angles of arrival and the frequency drifts at the level of the receivers of the base station are not detailed herein and are known by those skilled in the art. As an example, the angle measurements are performed by projection onto angular sub-spaces due to beam forming and the frequency drifts on the baseband signals are measured via the phase variations of said signals.

Antenna system 200 then sends a downlink signal to radio device 201 over a downlink channel or downlink (DOWN-LINK). Over the downlink, the offset between the frequency of the transmitted signal and that of the received signal can be written as:

$$\Delta F_{DL} = -F_{CFO} + F_{DOP},\qquad\text{(Math 4)}$$

where $\Delta F_{DL}$ represents the difference between the frequency of the downlink signal and the frequency of the signal received by the radio device.

Figure 5:
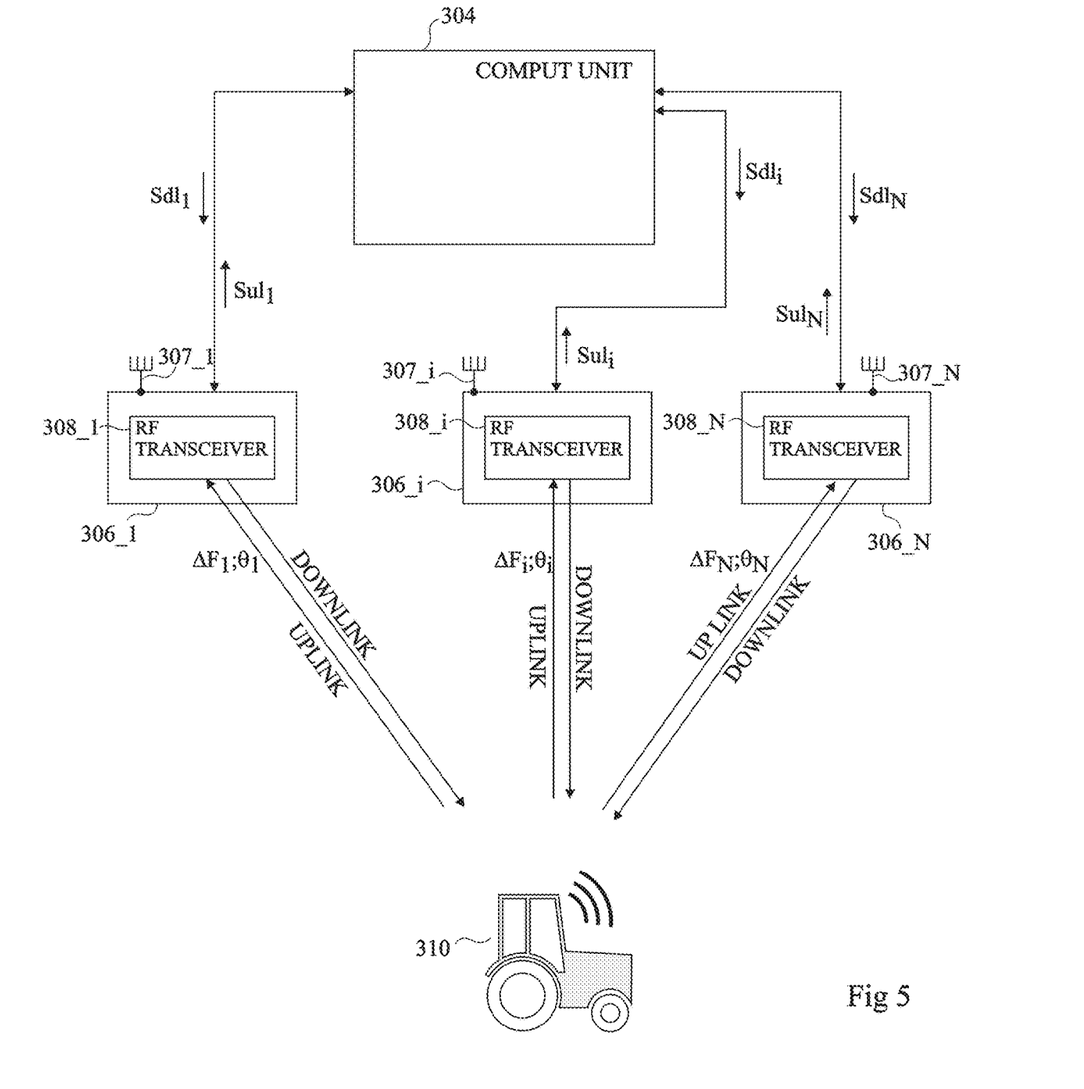
FIG. 5 schematically shows in the form of blocks an example of a distributed multiple-input-multiple-output system illustrating an implementation mode of the described method.

FIG. 5 schematically shows in the form of blocks an example of a distributed multiple-input-multiple-output system illustrating an implementation mode of the described method.

The system shown in FIG. 5 corresponds to a distributed network formed of a base station comprising a computing unit 304 (COMPUT UNIT) and a number N of antenna systems 306 (306_1, ..., 306_i, ..., 306_N), N being an integer number greater than or equal to 3. Each antenna system 306 comprises at least one antenna 307 (307_1, ..., 307_i, ..., 307_N) and one radio frequency head 308 (308_1, ..., 308_i, ..., 308_N) (RF TRANSCEIVER) configured to modulate the frequency of and then transmit downlink signals to a radio device 310 and receive uplink signals transmitted by radio device 310 and then set them back to baseband. The channels or links of propagation of the signals transmitted by the distributed network illustrated in FIG. 5 are dominated by a single path.

According to an embodiment, when the network is of cooperative type, it comprises a plurality of base stations, each formed of a computing unit and of at least one antenna system. The link between the base stations is generally wired, for example, by means of optical fiber.

During a connection of radio device 310 to the distributed (non-cooperative) network, computing unit 304 transmits a signal to each of antenna systems 306. The signal transmitted by the computing unit is, according to the type of implementation of the network, different or not according to antenna systems 306.

When computing unit 304 transmits a signal to an antenna system 306, this signal is processed by the radio frequency head 308 of antenna system 306 and then is transmitted to radio device 310 via the antennas 307 of antenna system 306.

The transmissions between each antenna system 306 and radio device 310 are performed over uplinks UPLINK (from the radio device to the antenna systems) and downlinks DOWNLINK (from the antenna systems to the radio device).

In the applications targeted by the present disclosure, once the N downlink signals have been received by radio device 310, the latter returns, over uplinks UPLINK, an uplink signal, having a modulated frequency and with the presence of frequency offsets, to each antenna system 306. Each radio frequency head 308 then transmits an uplink signal Sul ($Sul_1, \ldots, Sul_i, \ldots, Sul_N$) set back to baseband, with the presence of frequency offsets, to computing unit 304 which then respectively measures a drift (or offset) in the frequency ($\Delta F_1, \ldots, \Delta F_i, \ldots, \Delta F_N$) between the transmitted signal and the received signal as well as an angle of arrival ($\theta_1, \ldots, \theta_i, \ldots, \theta_N$) for each of the N received uplink signals.

In the case of a cooperative network, each computing unit of each base station will then measure the frequency drifts and the angles of arrival of the signals received by its antenna systems. The collected measurements are then shared towards all the cooperative base stations linked to the same radio device.

Computing unit 304 then estimates the offsets $F_{COF}$ and $F_{DOP}$ (FIG. 2) as well as a displacement angle $\theta_M$ of the radio device by a resolution of a regression problem defined by the expression:

$$\Delta F_i = F_{CFO} + F_{DOP} \cos(\theta_i - \theta_M), \, i \in \{1, \ldots, N\}. \quad \text{(Math 5)}$$

This expression describes the frequency drift or offset in a distributed network where the radio device is mobile and where the clock of the radio device is not synchronized with the clocks of the different radio frequency heads.

Quantities $F_{COF}$ and $F_{DOP}$ do not depend on the rank i of the considered antenna system 306. It is assumed for this purpose that the clocks of the antenna systems 306 are all synchronized, for example, by a synchronization protocol of TSN (Time-Sensitive Network) type.

Once the estimation of offsets $F_{CFO}$, $F_{DOP}$ and of angle $\theta_M$, which does not depend on the ranks of the antenna systems, has been performed by computing unit 304, the latter adjusts the frequency of the signals to be transmitted by each antenna system 306 to radio device 310. New downlink signals Sdl ($Sdl_1, \ldots, Sdl_i, \ldots, Sdl_N$) set back to baseband with a frequency offset compensation are then transmitted by computing unit 304 to each antenna system 306. Each antenna system 306 then transmits, via the downlinks (DOWNLINK), a frequency-modulated downlink signal with a frequency offset compensation.

Figure 6:
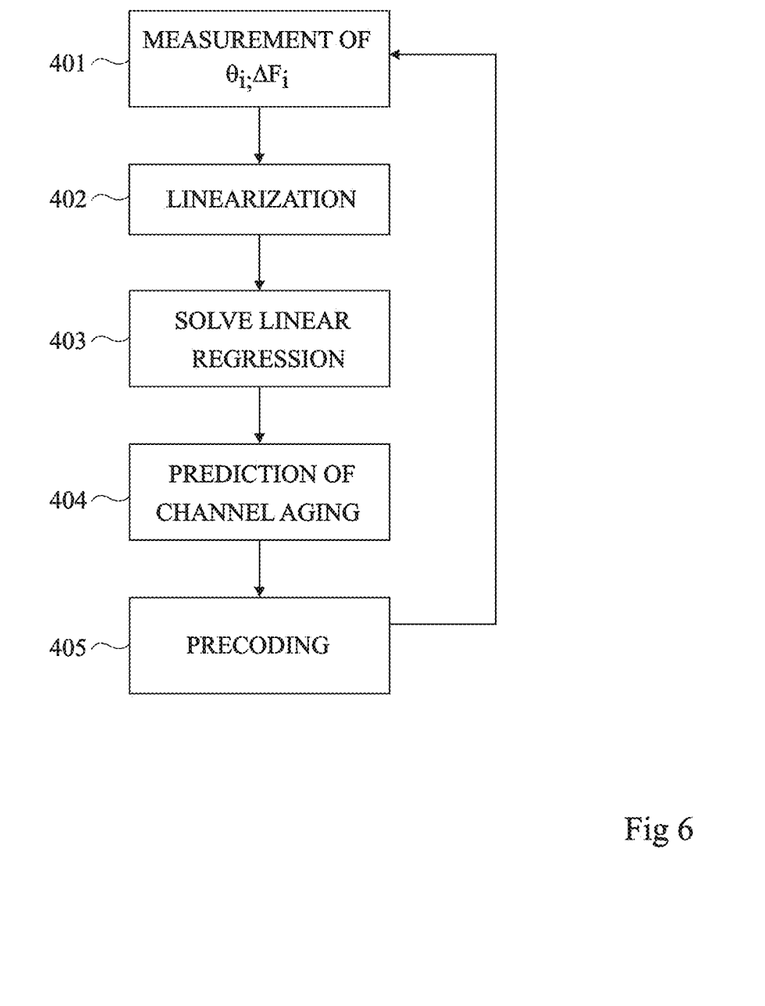
FIG. 6 is a flowchart showing steps of an implementation mode of the described method.

FIG. 6 is a flowchart showing steps of an implementation mode of the described method.

At a step 401 (MEASUREMENT OF $\theta_i$; $\Delta F_i$), the computing unit 304 of the distributed network illustrated in FIG. 5 measures the angles of arrival of the uplink signals as well as frequency drift or offset $\Delta F_i$ based on the uplink signals transmitted by radio device 310 and received by antenna systems 306.

To be able to estimate offsets $F_{COF}$ and $F_{DOP}$ as well as the displacement angle of radio device 310 to adjust the transmitted signals, the expression:

$$\Delta F_i = F_{CFO} + F_{DOP} \cos(\theta_i - \theta_M), \, i \in \{1, \ldots, N\}, \quad \text{(Math 6)}$$

is linearized at a step 402 (LINEARIZATION) subsequent to step 401 and by computing unit 304, into a linear expression:

$$\Delta F_i = F_{CFO} + F_{DOP} \cos(\theta_M)\cos(\theta_i) + F_{DOP} \sin(\theta_M)\sin(\theta_i), \, i \in \{1, \ldots, N\}. \quad \text{(Math 7)}$$

This linearization can be written in matrix form:

$$A = XB \quad \text{(Math 8)}$$

where

A is a vector of size N formed of the frequency drifts measured by computing unit 304. In other words, $$A = (\Delta F_1, \ldots, \Delta F_N), \quad \text{(Math 9)}$$

B is a matrix of size 3*N written as:

$$B = \begin{pmatrix} 1 & \cdots & 1 \\ \cos(\theta_1) & \cdots & \cos(\theta_N) \\ \sin(\theta_1) & \cdots & \sin(\theta_N) \end{pmatrix}, \quad \text{(Math 10)}$$

X is a vector of size 3 written as:

$$X = (F_{CFO}, F_{DOP}\cos(\theta_M), F_{DOP}\sin(\theta_M)). \quad \text{(Math 11)}$$

Mathematical objects A and B are only formed of the known values, measured by computing unit 304 and the coordinates of vector X are only a function of the parameters to be estimated.

At a step 403 (SOLVE LINEAR REGRESSION), subsequent to step 402, the linear regression problem described by the linear expression obtained at step 402 is solved by computing unit 304. An estimate $X_{estim}$ of vector X is then given by the expression:

$$X_{estim} = AB^T(BB^T)^{-1}, \quad \text{(Math 12)}$$

where matrix $B^T$ designates the transpose matrix of matrix B and matrix $(BB^T)^{-1}$ designates the inverse matrix of matrix product $BB^T$. Estimated values $F2_{CFO}$, $F2_{DOP}$ and $\theta 2_M$ of offsets $F_{CFO}$, $F_{DOP}$ as well as of angle $\theta_M$ are then provided by the expressions:

$$F2_{CFO} = X_{estim}(1),$$

$$F2_{DOP} = \sqrt{X_{estim}(2)^2 + X_{estim}(3)^2},$$

$$\theta 2_M = \arctan(X_{estim}(3)/X_{estim}(2)), \quad \text{(Math 13)}$$

where $X_{estim}(1)$, $X_{estim}(2)$, and $X_{estim}(3)$ respectively designate the first, the second, and the third coordinate of vector $X_{estim}$.

At a step 404 (PREDICTION OF CHANNEL AGING), subsequent to step 403, an aging of the downlink propagation channels $H_i$, due to a delay $\Delta t$ after the estimation of the downlink channel at a time $t_0$, is estimated based on the estimates obtained at step 403 and according to the expression:

$$H_i(t_0 + \Delta t) = H_i(t_0)\exp(j2\pi(-F2_{CFO} + F2_{DOP}\cos(\theta_i - \theta 2_M))\Delta t) \quad \text{(Math 14)}$$

where $H_i(t_0)$ is the state of the channel at the time of the estimation of channel $t_0$ and j is the complex number such that its square is equal to $-1$. Channel estimation techniques are known by those skilled in the art and are not detailed any further.

At a step 405 (PRECODING), subsequent to step 404, the downlink signals are adjusted and jointly pre-coded by taking into account the estimates obtained at steps 403 and 404. The adjustment of the signals is for example implemented by the so-called zero-forcing method, although other adjustment methods are possible.

After step 405, the method resumes, for each received uplink signal or periodically, at step 401 after a delay of for example several milliseconds. For example, the period varies from 1 to 20 milliseconds.

Figure 7:
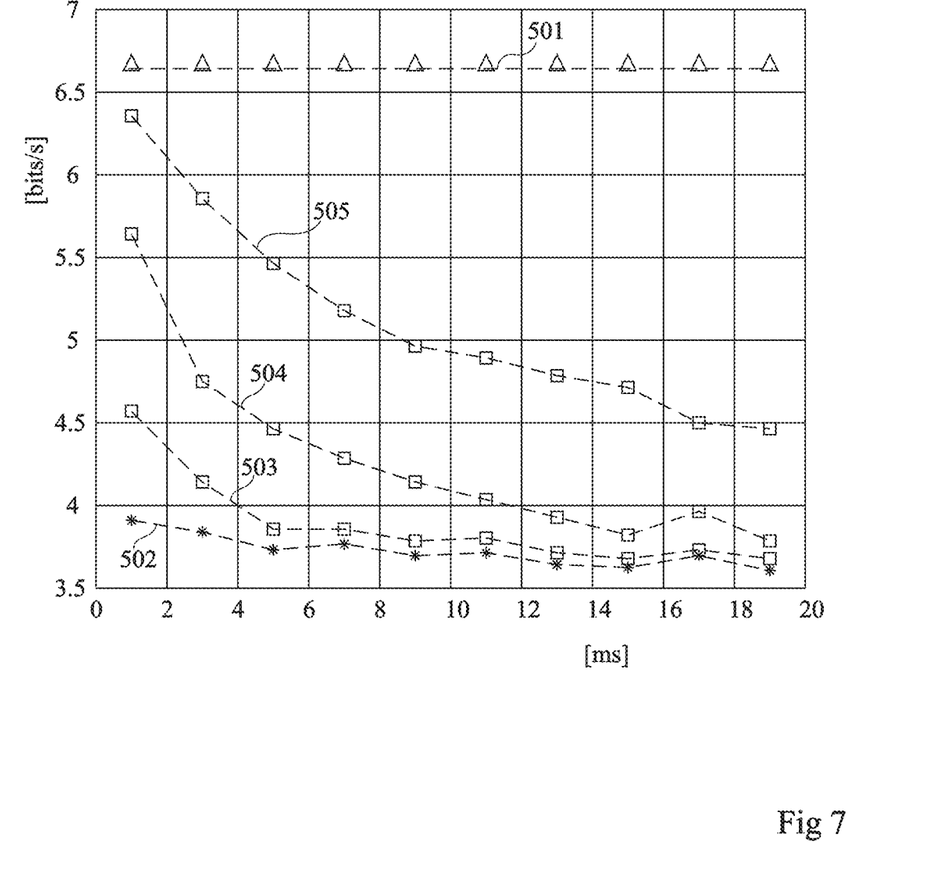
FIG. 7 is a graph illustrating examples of rate according to the aging of the channel in the described embodiments.

FIG. 7 is a graph illustrating examples of rate according to the aging of the channel in the described embodiments.

The graph of FIG. 7 comprises five curves describing the rate variations of a signal in bits per second according to the delay after the last estimation of the channel in milliseconds in a distributed network similar to that illustrated in FIG. 5 and comprising four antenna systems and having four radio devices connected thereto. The channel aging designates the phase variation induced by the time which has elapsed since the last execution of the method illustrated in FIG. 6, in particular since the last adjustment of the transmitted signals.

A curve 501 shows the variation of the rate of a signal in an ideal distributed network, that is, a distributed network where the clocks of the radio devices are synchronized with the clocks of the antenna systems and where the radio devices are not moving. In this case, there is no offset between the frequencies of the transmitted signals and the frequencies of the received signals. This ideal situation enables to obtain, in this example, a constant rate of between 6 and 7 bits per second. However, this ideal situation is not representative of reality.

A curve 502 shows the variation of the rate of a signal in a distributed network, where there exists an offset between the frequencies of the transmitted signals and the frequencies of the received signals and where no adjustment is performed. Curve 502 has a poor rate and this, from as soon as the first signals transmitted by the antenna system to the radio devices. Curve 502 slightly decreases over the first three transmissions and remains, in this example, relatively stable on a very low rate value of between 3.5 to 4 bits per second.

A curve 503 shows the variation of the rate of a signal in a distributed network, where there exists an offset between the frequencies of the transmitted signals and the frequencies of the received signals and where an estimation of the offsets is performed according to the method disclosed in relation with FIG. 6. In this distributed network, the beams of the antenna systems are wide, that is, the angular resolution of the antenna systems is low. Curve 503 shows, in this example, that the quality of the first signals after the adjustment based on the estimate is better than with no adjustment. The quality of the signals then rapidly degrades while waiting for a new iteration of the compensation method disclosed by FIG. 4.

Curves 504 and 505 show the variation of the rate of a signal in a distributed network implementing an estimation of the offsets according to the method disclosed in FIG. 4. For these networks, the beams of the antenna systems are narrower and the angular resolution is thus better. Due to the estimation and the adjustment of the signals, the quality of the signal of these two networks is close to ideal curve 501 (approximately 5.5 bits per second for the network represented by curve 504 and approximately 6.5 for the network represented by curve 505). The quality of the signal represented by curve 504 degrades and, after some fifteen milliseconds, becomes close to the quality of the signal represented by curve 502. In this example, curve 505 decreases less rapidly than curves 503 and 504, indeed, 20 milliseconds after the adjustment, the rate exhibited by curve 505 is at 4.5 bits per second. The observed differences in performance are induced by the narrowness of the beams used by the antenna systems. The narrower the beams, the more reliable the measurement of angle of arrival Oi and thus the better the joint estimation of the frequency drifts.

An advantage of the described embodiments is that the knowledge of the location of the radio devices is not necessary for the estimation of their displacement angles.

Another advantage of the described embodiments is that it is not necessary either to have multiple-path propagation channels.

Another advantage of the described embodiments is that they apply to distributed networks, such as distributed MIMO-type networks, as well as to cooperative networks comprising a network of cooperative base stations.

Various embodiments and variants have been described. Those skilled in the art will understand that certain features of these various embodiments and variants may be combined, and other variants will occur to those skilled in the art.

Finally, the practical implementation of the described embodiments and variants is within the abilities of those skilled in the art based on the functional indications given hereabove. In particular, different types of distributed networks enable to implement the described embodiments.

What is claimed is:

1. Method of estimation and correction, at the level of a base station, of a frequency drift between signals transmitted by a plurality of antenna systems spatially distributed around a computing unit of the base station and signals received by a radio device, the method comprising:

a) the sending, by the radio device, of a first signal, said signal being received by each of the antenna systems;
b) the conversion, by the antenna systems, of said first received signal into second baseband signals, and their transmission, by the antenna systems, to the computing unit;
c) the measurement, by the computing unit, of angles of arrival of the second signals and of the frequency drift of the second baseband signals;
d) the estimation, by the computing unit, of a displacement angle of the radio device, of a first frequency offset induced by the displacement of the radio device, and of a second frequency offset between a clock of the radio device and synchronized clocks of the antenna systems;
e) the frequency adjustment and the pre-coding, by the computing unit and for each of the antenna systems, of third baseband signals; and
f) the transmission, by the computing unit, of the third baseband signals to the plurality of antenna systems and the transmission, by said plurality of antenna systems, of said third baseband signals to the radio device.

2. Method according to claim 1, wherein the estimation of the displacement angle of the radio device, of the first frequency offset, and of the second frequency offset, is performed by resolution of a regression problem described by the following expression:

$$\Delta F_i = f_{CFO} + F_{DOP} \cos(\theta_i - \theta_M), i \in \{1, \ldots, N\},$$

where N designates the number of antenna systems, i designates the rank of the antenna system, $\Delta F_i$ designates the frequency drift measured by the antenna system of rank i, $\theta_i$ designates the angle of arrival measured by the antenna system of rank i, $\theta_M$ designates the displacement angle of the radio device, $F_{COF}$ and $F_{DOP}$ respectively designate the first and the second frequency offset.

3. Method according to claim 2, wherein the regression problem is solved by means of a linearization of the expression describing said regression problem, the linearization being written as:

$$\Delta F_i = F_{CFO} + F_{DOP} \cos(\theta_M)\cos(\theta_i) + F_{DOP} \sin(\theta_M)\sin(\theta_i), i \in \{1, \ldots, N\}.$$

4. Method according to claim 1, wherein the displacement angle of the radio device is estimated independently from a location of the radio device.

5. Method according to claim 1, wherein the frequency adjustment of the third signals transmitted to the radio device is performed by adapting the directivity and/or the power and/or the phase of each antenna system based on said estimate.

6. Method according to claim 5, wherein the adaptation of the antenna systems is controlled by the computing unit.

7. Method according to claim 1, wherein, for each of the antenna systems, the frequency adjustment of the third transmitted signals comprises a compensation of the channel aging effect based on the estimate.

8. Method according to claim 1, wherein steps a) to f) are periodically repeated.

9. System comprising a plurality of antenna systems and a base station configured for the implementation of the method according to claim 1, said antenna systems being spatially distributed around a computing unit of the base station.

10. System according to claim 9, wherein the antenna systems contain radio frequency heads.

11. System according to claim 9, wherein the computing unit of the base station is configured to implement the estimation of said displacement angle, of said first frequency offset, and of said second frequency offset.

12. System according to claim 9, comprising a plurality of base stations communicating with one another, one of these base stations performing said estimation and transmitting adaptation parameters to the other base stations.

13. System according to claim 12, wherein the other base stations are radio frequency heads.

14. System according to claim 9, wherein the propagation channels of the third signals transmitted by the antenna systems are single-path.

\* \* \* \* \*